US012705728B2

(12) United States Patent
Niederer et al.

(10) Patent No.: US 12,705,728 B2
(45) Date of Patent: Aug. 11, 2026

(54) METHOD FOR IDENTIFYING WOOD-BASED PANELS

(71) Applicant: Fritz Egger GmbH & Co. OG, St. Johann in Tirol (AT)

(72) Inventors: Ralf Niederer, Frankenfels (AT); Christian Maurer, Saalfelden am Steinernen Meer (AT)

(73) Assignee: Fritz Egger GmbH & Co. OG, St. Johann in Tirol (AT)

( * ) Notice: Subject to any disclaimer, the term of this patent is extended or adjusted under 35 U.S.C. 154(b) by 304 days.

(21) Appl. No.: 18/287,698

(22) PCT Filed: Apr. 20, 2022

(86) PCT No.: PCT/EP2022/060318

§ 371 (c)(1),
(2) Date: Oct. 20, 2023

(87) PCT Pub. No.: WO2022/223563

PCT Pub. Date: Oct. 27, 2022

(65) Prior Publication Data

US 2024/0185411 A1 Jun. 6, 2024

(30) Foreign Application Priority Data

Apr. 22, 2021 (EP) .................................... 21169861

(51) Int. Cl.

| | |
|---|---|
| ***G06T 7/00*** | (2017.01) |
| ***G06V 10/82*** | (2022.01) |
| ***G06V 20/80*** | (2022.01) |

(52) U.S. Cl.

CPC .............. *G06T 7/001* (2013.01); *G06V 10/82* (2022.01); *G06V 20/80* (2022.01); *G06T 2207/20084* (2013.01); *G06T 2207/30161* (2013.01)

(58) Field of Classification Search

CPC ........... G06T 7/001; G06T 2207/20084; G06T 2207/30161; G06T 2201/06; G06V 10/82; G06V 20/80

See application file for complete search history.

(56) References Cited

U.S. PATENT DOCUMENTS

| | | | |
|---|---|---|---|
| 9,269,161 B2 | 2/2016 | Wei et al. | |
| 10,580,126 B1 * | 3/2020 | Weinschenk ........... | G06F 30/13 |

(Continued)

FOREIGN PATENT DOCUMENTS

| | | |
|---|---|---|
| EP | 2969428 B1 | 12/2016 |
| WO | 2005010628 A1 | 2/2005 |

(Continued)

*Primary Examiner* — Samir A Ahmed
(74) *Attorney, Agent, or Firm* — The Webb Law Firm

(57) ABSTRACT

The invention relates to a method for identifying wood-based panels, in which at least one comparison image is recorded for a predetermined section of a side edge for a plurality of wood-based panels, in which a comparison data record is determined and stored from the comparison image using the structure, in particular on the basis of the geometry, the topography and/or the distribution of the wood-based elements, in which a test image is recorded at at least one later time for the predetermined section of a side edge of a wood-based panel, in which a test data set is determined from the test image on the basis of the structure, in particular on the basis of the geometry, topography and/or the distribution of the wood material elements in the same way as for the comparison data sets, in which the test data set of the tested wood material panel is compared with the comparison data sets of a plurality of wood material panels, and in which the tested wood material panel is identified as the wood material panel for which the comparison data set was generated if the test data set matches a comparison data set. The method solves the technical problem of improving and simplifying the identification of wood-based panels.

17 Claims, 10 Drawing Sheets

(56) References Cited

U.S. PATENT DOCUMENTS

| | | | | |
|---|---|---|---|---|
| 2005/0161118 | A1 | 7/2005 | Carmen et al. | |
| 2009/0095377 | A1* | 4/2009 | Barker | B27B 31/06 144/357 |
| 2009/0255607 | A1* | 10/2009 | Barker | G06Q 20/208 144/357 |
| 2015/0072099 | A1* | 3/2015 | Reiter | B32B 3/06 428/58 |
| 2021/0279850 | A1* | 9/2021 | Beaudet | G06V 10/44 |

FOREIGN PATENT DOCUMENTS

| | | | | | |
|---|---|---|---|---|---|
| WO | 2012083769 | A1 | | 6/2012 | |
| WO | WO 2012083769 | | * | 6/2012 | G06V 20/698 |
| WO | WO-2018169712 | A1 | * | 9/2018 | G06N 7/01 |

* cited by examiner

| N | dl (mm) | $\alpha$ (°) | Betrag [dx (mm)] |
|---|---|---|---|
| 1 | 35 | 10 | +34,4 |
| 2 | 32 | -6 | +31,8 |
| 3 | 31 | 0 | +31,0 |
| ⋮ | ⋮ | ⋮ | ⋮ |
| 20 | 22 | 70 | +7,5 |

$$\sum_{N=1}^{20} dx\,(N)$$

| 10 | 75 | 190 | 205 | 220 | 180 | 135 | 108 |
|---|---|---|---|---|---|---|---|
| 210 | 87 | 52 | ... | ... | ... | ... | ... |
| 51 | 137 | 210 | ... | ... | ... | ... | ... |
| 152 | 130 | ... | ... | ... | ... | ... | ... |
| ... | ... | ... | ... | ... | ... | ... | 195 |

V= { 10; 75 ; 190 ; 205 ; 220 ; 180 ; 135 ; 108 ; 210 ; 87 ; 52 ; ... ; 51 ; 137 ; 210 ; ... ; 152 ; 130 ; ... ; 195}

METHOD FOR IDENTIFYING WOOD-BASED PANELS

CROSS-REFERENCE TO RELATED APPLICATIONS

This application is the United States national phase of International Application No. PCT/EP2022/060318 filed Apr. 20, 2022, and claims priority to European Patent Application Ser. No. 21/169,861.8 filed Apr. 22, 2021, the disclosures of which are hereby incorporated by reference in their entireties.

BACKGROUND OF THE INVENTION

Field of the Invention

The invention relates to a method for identifying wood-based panels.

Description of Related Art

Wood-based panels, in particular particleboard, oriented strand board (OSB), high density fibre (HDF), medium density fibre (MDF) or fibreboard, are manufactured on a large scale. The manufacturing parameters present during production, such as the types of wood-based material elements such as chips or fibres, the size distributions of the wood-based material elements, the type of resins and, if applicable, additives used, the process temperatures and process pressures are critical parameters for the quality of the wood-based panels. In addition, there is logistical information such as the date of manufacture, place of manufacture, transport routes and storage locations.

Due to the increasing networking of distribution channels and the increasing requirements for quality certificates, it is desirable to be able to assign the manufacturing parameters and logistical information to each individual wood-based panel.

In the prior art of EP 2 969 428 B1, the wood-based panels are printed with an optical code in the form of a barcode or a QR code, wherein the information content of the code is linked to manufacturing parameters or other parameters in a database. If a wood-based panel is to be tested at a later time, the optical code is scanned and the manufacturing parameters or other parameters are assigned to the tested wood-based panel using the information content of the code and the database. The tested wood-based panel can therefore be characterised.

However, the problem with the previously described method is that the code is applied to the side edge of the wood-based panel and either a carrier material such as a sticker must be applied or the code is printed directly onto the side edge. In both cases, the code can become damaged and thus unusable and cannot be restored. The readability of a code printed directly on the side edge may also be limited.

SUMMARY OF THE INVENTION

Therefore, the present invention is based on the technical problem of improving and simplifying the identification of wood-based panels.

The aforementioned technical problem is solved according to the invention by a method for identifying wood-based panels, in which at least one comparison image is recorded for a predetermined section of a side edge for a plurality of wood-based panels at a first time, in which a comparison data record is determined and stored from the comparison image on the basis of the structure, in particular on the basis of the geometry, the topography and/or the distribution of the wood-based elements, in which an test image is recorded at a second time for the predetermined section of a side edge of a wood-based panel, in which a test data set is determined from the test image on the basis of the structure, in particular on the basis of the geometry, topography and/or the distribution of the wood material elements, in the same way as for the comparison data sets, in which the test data set of the tested wood material panel is compared with the comparison data sets of a plurality of wood material panels, and in which the tested wood material panel is identified as the wood material panel for which the comparison data set has been generated if the test data set matches a comparison data set.

According to the invention, it has been recognised that the visible structure of the wood-based material, in particular on a side edge, consisting of the wood-based material elements and optionally also of the resins and, if applicable, additives connecting them, is so diverse in structure both due to different starting materials and due to random variations in the nature of the wood-based material that are not controlled in the manufacturing method that this structure can be used as a feature for identification. Thus, without any application of labels or printing of codes or other markings, individual sections of the side edges can in themselves be used as an identifying feature.

The structure is determined, for example, by the shape properties of the side edge, such as the properties of the wood-based material elements, i.e. their size, their individual and/or common alignment, the variability of the size, the existence and/or number of different types of wood-based material elements, the dimensions of the distances between wood-based material elements or the presence and distribution of unfilled free spaces between the wood-based material elements. In this context, not only individual wood-based material elements can be distinguished, but rather the overall appearance of the side edge can be considered as a structure. Furthermore, the structure can additionally or alternatively be determined by the depth profile of the side edge. Alternatively or in addition to the shape properties, the structure may also be determined by the colour and/or brightness of the side edge. This can be the basic colour and basic brightness of the side edge, but also the variability of the colour and brightness, the colour of the wood material elements or the additives.

The comparison data sets and the test data set are calculated in the same way, for example by applying the same algorithm or generally the same calculation rule. This ensures that comparison images and test images taken at different times (e.g., the first time and the second time) from the same predetermined section result in comparison data sets and test data sets that are as similar or identical as possible. The data sets can also be calculated in the same way, for example by applying slightly different calculation rules, if it can be ensured that the calculation rules lead to comparable data sets.

The identification can then be carried out starting from the point in time after the actual production of the material plate and subsequently during the possible further processing by coating, intermediate storage, transport and distribution up to the final processing. For this purpose, the step of determining the comparison data set is carried out, preferably as early as possible, after the plates have been manufactured and have left the pressing plant.

In general, it is sufficient to take a comparison image for each wood-based panel for one section and to process it as described above. However, this also means that when the wood-based panel is tested later, the relevant section must be found. For this purpose, the section can be found by the position of a corner of the wood-based panel as the boundary of the side edge. Alternatively, the section can also be found by means of a visual marking. For example, the marking can be printed as a rectangle that outlines the section. However, the marking can also be a logo that delimits the section laterally, preferably by a line. In any case, such a marking is only provided to determine the location of the relevant section and does not serve to enable identification of the panel itself provided with it.

In an advantageous manner, comparison images can be taken for several sections on at least one of the side edges, in particular for at least one section on each side edge, of the wood-based panel and a comparison data set can be determined for each comparison image. This increases the number of sections possible for a subsequent test and facilitates the performance of the test on site. For example, for a rectangular wood-based panel, all sections adjacent to each corner in both directions can be used to take comparison images. No markings are then necessary as the positioning of the sections is dictated by the physical boundaries of the wood-based panel. In total, this example results in eight comparison images with one comparison data set each. The length of the comparison images along the side edge can be predetermined here, so that the end of the section facing away from the corner is also known without the need for a marker. This length can be predefined absolutely or also relative to the panel thickness.

In a further embodiment of the described method, a test image is recorded and a test data set is determined for a part of the several sections with comparison data sets, in particular at a section of several sections with comparison data sets. Thus, for a wood-based panel for which several comparison data sets have been created and stored, it is sufficient to create a test data set for the comparison only for a part of the sections or even only for one section.

A further embodiment of the method is that comparison images are taken for a plurality of sections at predetermined intervals along at least part of a side edge and comparison data sets are generated for the comparison images, and that at the second time an test image is taken in the area of the plurality of sections of the side edge and an test data set is determined for comparison with the comparison data sets. In this case, the sections may also overlap if a part of the side edge or the entire side edge is divided into sections at the predetermined distances. The distances can even be chosen so small that two sections are spaced apart by one raster unit of the resolution of the subsequent image evaluation. This increases the number of sections, but a section for an test image can be selected at almost any point along the side edge, which further simplifies the test of the wood-based panel.

An entire side edge on one or more sides, in particular the entire circumferential side edge comprising all side edges of the panel, can also be recorded as a coherent comparison image. Individual comparison images can be generated from this coherent comparison image. Likewise, a comparison between an test image and the coherent comparison image can be made directly, without prior classification of the coherent comparison image. This is possible, for example, by template matching, in which the test image is searched for in the contiguous comparison image. Conversely, it is also possible to take a contiguous test image of all side edges and search for comparison images in it.

Since the side edge itself serves for identification, it is advantageous if, after machining at least one side edge of the wood-based panel, at least one comparison image is recorded for this at least one side edge for at least one section and a comparison data set is determined. In this case, machining means in particular a removal of material by a surface treatment, wherein the superficially visible structure of the wood-based material is changed. By taking a new comparison image of the modified section and the comparison data set generated from this, it remains possible to identify the wood-based panel.

The same applies after a separation of one of the wood-based panels into at least two partial formats, in which, after a separation of one of the wood-based panels into at least two partial formats, at least one new comparison image is recorded for at least one section on at least one newly created side edge of the partial formats for each resulting partial format, and a new comparison data set is determined, and in which, for each partial format, each new comparison data set is linked to the original wood-based panel. The resulting at least two partial formats are then independently linked to an original wood-based panel so that each partial format can be assigned to the original wood-based panel.

The previously explained recording of the comparison images preferably takes place after the production of the wood-based panel, after cutting to the formats to be delivered and further preferably before its further processing such as coating with colour applications or with paper layers and/or impregnates. On the other hand, it can also be advantageous to take the comparison images after coating, i.e. in the state in which the wood-based panel is taken to a warehouse for delivery or is already made ready for transport. At these times, the wood-based panel has its final structure of the side edges independent of further coatings.

Preferably, the wood-based panel is coated on one upper side with one layer or on both upper sides with different layers that can be distinguished in a side view. Then it can be advantageous to generate the at least one comparison image only after the coating, so that the orientation of the wood-based panel can be determined and taken into account on the basis of the coating or coatings visible from the side.

Furthermore, comparison images can be taken at several stations of the manufacturing method, preferably always shortly before and/or shortly after the appearance of the side edge might have changed due to a manufacturing step. Thus, traceability can be realised throughout the entire manufacturing chain.

The aforementioned comparison images and test images, also referred to as images in the following, can be taken with conventional camera systems. All 2D image cameras such as CCD cameras, single-lens reflex cameras (DSLR), mirrorless system cameras (DSLM) or smartphone cameras, the latter in particular for the creation of the test images, can be used as cameras. In addition, spectral cameras are available that break down and store each pixel into a multi-channel spectrum using a spectral measurement method, wherein a brightness and colour value in the RGB colour space with the values for red (R), green (G), blue (B) or in the L*a*b* colour space with pixel values L* (brightness), a* (red-green value), or b* (blue-yellow value) or in other colour spaces are derived from the spectral information per pixel. Using a spectral camera has the advantage that the brightness and colour values can be captured and mapped more accurately.

The aforementioned comparison images and test images can be taken under artificial lighting. The lighting can preferably be essentially identical for each individual image and can be located directly in the vicinity of the camera.

Other light sources such as sunlight through a window, the lighting of the production hall, etc. should be shielded so that only the lighting illuminates the edge area to be recorded.

In addition, the edge can also be recorded in a closed chamber or the camera, illumination and side edge are enclosed together in an opaque housing at the moment of recording. This ensures that only differences in the side edge lead to differences in the comparison and test images and that possible interferences from surrounding light sources do not also falsify the image. Thus, even small differences in colour, brightness, structure, etc. of the side edges can be reliably distinguished. The light source can be adapted to the nature of the side edge and/or the camera. Likewise, several images can be taken and combined under different lighting, for example at different wavelengths.

The determination of a comparison data set from the comparison images can be done in different ways. Basically, any determination method that leads to a value or values that can be used in a subsequent comparison algorithm is suitable to be used in the described procedure.

A first embodiment example of a determination method consists of analysing the captured structure of the wood-based material in each image, preferably with one or more image analysis programs known per se. For example, OpenCV, scikit-image, Google Cloud Vision API, Microsoft Computer Vision API, vlfeat, dlib, Matlab Image Processing Toolbox can be mentioned here.

From the analysed structure of the wood-based material elements, structure values are then determined by the shape, the perimeter, the area, the length, to be determined as the longest extension of the shape, and/or the orientation, to be determined as the direction of the longest extension of the shape, of the wood-based material elements in relation to the dimensions of the recorded section of the side edge. The comparison data set and the test data set are then determined as a sequence of structural values for a predetermined proportion of the wood-based material elements. The necessary number of structure values for each image depends on the individuality of the wood-based material elements and is determined according to the application. In any case, the structure values are decisive for the identifiability of the section and thus the wood-based panel. Their order in the sequence of structure values may be decisive or irrelevant.

For example, the length and the angle to the side edge extension can be determined for a given number of wood-based material elements according to size and mathematically converted into a single value, preferably by summation. If n sections are then evaluated, for example n=4, this results in 4 values that can be combined to form a 4-dimensional vector. Such an n-dimensional vector then serves as a comparison data set and can be compared with a correspondingly determined test data set in n-dimensional space.

In a further preferred embodiment of the described method, the determination method consists of dividing each image into pixel areas according to a predetermined grid with respect to the orientation of the section of the recorded side edge, in which each pixel area is assigned a pixel value calculated from the individual pixels, preferably an averaged pixel value, i.e. a brightness value and/or at least one colour value, and in which the comparison data set or the test data set is determined as a sequence of pixel values in a predetermined order from the pixel areas.

Thus, a raster of, for example, N×M pixels with a gradation of 256 grey level values is determined, the pixels of which each represent the aforementioned pixel areas. The respective grey level value of a pixel area can be determined by averaging or another mathematical method and represents an averaged grey level of the brightness information or one of the colour information of the pixels. If the grey level values are lined up in a predetermined order, a characteristic comparison data set or test data set is obtained, which can be used as a basis for the subsequent comparison step. Here, too, one can mathematically define a vector with N×M vector components, which can then also be understood as a matrix. A vector can then be generated from the matrix by averaging each row.

The images can be prepared or pre-processed beforehand using an optical filter or a software filter. For example, an edge filter can be used to emphasise the alignment of wood fibres.

A further embodiment of the described method is that the images, i.e. the comparison images and the test images, are each taken with a 3D camera. An example of a 3D camera is a LIDAR camera as a stand-alone camera or as part of a smartphone. LIDAR is the abbreviation of LIght Detection And Ranging. Another example of a 3D camera has two laterally offset cameras.

In addition to LIDAR technology, other contactless technologies can also be used to capture the 3D structure of the surface or its roughness. These are

- Radio Detection And Ranging (RADAR),
- Sound Detecting And Ranging (SODAR),
- confocal measurement methods using laser light,
- White light interference using LED light and interferometry,
- Wide Area 3D profile measurement using white LED light and creating and measuring a stripe pattern on the surface,
- Laser profilometry similar to wide area 3D profile measurement with laser light or
- the measurement of surface texture by capacitive sensors.

In all the methods mentioned, a digital representation of the material surface of one side of the panel is generated and stored in one- or multi-dimensional resolution. Regardless of the measuring method used, the digital surface information obtained in this way can be converted as a comparison data set and test data set.

The method step for determining the image data set is first carried out by determining the topography, i.e. a height profile perpendicular to the surface orientation of the side edge, for each image. Subsequently, a contour line profile, sections of the contour profile, a triangular mesh or sections of the triangular mesh are derived from the topography as topography values and the comparison data set or the test data set is determined from the topography as a sequence of topography values in a predetermined order.

Thus, the comparison data sets and the test data sets consist of a sequence of characteristic parameters of the topography that allow identification of the wood-based panel. The sequence of parameters can be processed in the comparison step using a suitable algorithm.

The topography can also be determined by mechanically scanning the surface, for which various methods are known. For example, the surface can be scanned along a predefined track with a probe, for example in the form of a tactile probe. During the movement of the probe along the track, the different heights are recorded as digital values depending on the distance travelled and mathematically stored as a vector. By arranging tracks next to each other, further vectors can be determined, which can then also be stored as a matrix. Such a measuring method has been developed by the company Keyence Corporation for measuring surface roughness.

Instead of a stylus in the form of a needle, an atomic force microscope can also be used.

In mechanical scanning, the position of the measurement must be specified precisely, especially if multiple measurements are taken, even on different sides of the panel. The position of the measurement for the comparison data set on the surface is specified and stored in such a way that it can be repeated for a recording of the test data set. For example, the starting point of the measurement can be determined by distance information starting from a corner of a plate and the direction of the track to be scanned.

After a test data set has been determined, a comparison is made with the comparison data sets stored in a database in order to identify the wood-based panel if there is sufficient agreement, if necessary within predefined parameter limits.

The comparison between the test data set and the comparison data sets is done using mathematical methods.

In a first preferred way, an algorithm is used to calculate a mathematically defined distance between the comparison data sets and the test data sets, and then the distance is compared to a threshold value. If the calculated distance is less than the threshold value, a match can be determined. This performs a deterministic procedure given by a direct prescription of the chosen algorithm. Also, without a threshold, the comparison data set that has the smallest distance to the test data set of all comparison data sets can be selected as the best match.

An algorithm is generally to be understood as an unambiguous set of instructions for solving a problem or a class of problems. Algorithms consist of a finite number of defined individual steps. This means that they can also be implemented in a computer program for execution. In problem solving, a specific input is transformed into a specific output. In the case of the application of neural networks described below, a trained neural network is then used instead of a previously mentioned algorithm. A fully trained network is then also a defined system, but a description as an algorithm is not given here.

In a further embodiment of the described method, at least one neural network of a machine learning system is used.

Basically, a machine learning system allows the use of pattern analysis and pattern recognition. The visual intelligence used here makes it possible to recognise and analyse images or shapes. Examples of applications include handwriting recognition or the identification of people through facial recognition.

Neural networks are networks of artificial neurons and represent a branch of artificial intelligence. The topology of a neural network consists of the assignment of connections to nodes and is trained for the specific task, wherein the network can be trained by the following methods.

On the one hand, developing new connections, deleting existing connections, changing the weighting by weighting factors $w_{ij}$ from neuron j to neuron i, adjusting the threshold values of the neurons if they have threshold values, wherein only when the threshold value is reached does the neuron emit a signal to another neuron, adding or deleting neurons, and modifying activation, propagation or output functions can be applied to train the neural network.

On the other hand, a neural network will not independently make changes to its own topology during training. Rather, one tries out different topologies, partly automatically, and lets the neural network learn by adjusting certain parameters within the network, which ultimately corresponds to a learning step in each case.

Furthermore, the learning behaviour changes when the activation function of the neurons or the learning rate of the neural network changes. In practical terms, a network learns mainly by modifying the weights of the neurons. An adjustment of the threshold value can take place in parallel.

In artificial neural networks, topology refers to the structure of the network. This generally means how many artificial neurons are located on how many layers and how they are connected to each other. Artificial neurons can be connected in many ways to form an artificial neural network. In many models, neurons are arranged in layers one behind the other.

The training of a neural network is done with the largest possible number of comparison images or comparison data, for example 1,000 or 10,000 images. The entire image data or a mathematical representation of the image data can be used as input data in the neural network for the training. Preferably, the greyscale data in the raster of the comparison images are fed to the neural network as comparison data sets. In this case, the greyscales—as already explained above—are assigned in a value range of, for example, 256 greyscales.

In particular, a neural network, preferably a Convolutional Neural Network (CNN), can first be trained on a plurality of side edge images in the form of an autoencoder to obtain a mathematical representation of the data, such as greyscale data. In this process, the side edge images are converted into a feature representation in an encoder, the features of which are then learned so that the original image can be recovered based on them in a decoder. In this way, a fault-tolerant feature representation of the wood structure is generated. Each comparison data set and each test data set is subsequently transferred into the feature representation by the encoder. The test records can thus be compared with the comparison data records in a feature set adapted to the wood structure without having to define features manually.

In order to be able to generate an error-tolerant, mathematical representation of the images, autoencoders and decoders can also be used in the method described, which compensate for any errors in the original image and thus pass on an error-reduced image variant to the actual neural network for training.

As an alternative to a neural network, other machine learning methods (for example support vector machines) or mathematical methods can also be used.

Furthermore, a cross-correlation between two images, that of the test data and that of the comparison data, can be calculated, for example. Alternatively, other metrics such as a root mean square error or a cosine similarity can be used. If the similarity is high enough, a match can be detected. For the use of some metrics, it may be useful to transform the pixels from a two-dimensional matrix arrangement into a one-dimensional vector arrangement by means of a specified operation.

The test and comparison data can also be characterised by means of predetermined image features such as an entropy, a distribution of contiguous areas or a dominant fibre orientation. Using these features, a comparison can then be made between the feature values of a present test image and different comparison images.

The above technical problem is now solved according to the invention by a method for identifying wood material panels, in which for a plurality of wood material panels at least one classification is determined and stored for each wood material panel, in which at least one comparison image is recorded for a predetermined section of a side edge of each wood material panel, in which a comparison data record is determined and stored from the comparison image on the basis of the structure, in particular on the basis of the geometry, the topography and/or the distribution of the wood material elements, in which a neural network of a machine learning system is trained with the comparison data sets with the specification that each comparison data set fed in is assigned to a classification, in which an test image for the specified section of a side edge of a wood-based panel is recorded at a second time, in which a test data set is determined from the test image on the basis of the structure, in particular on the basis of the geometry, topography and/or the distribution of the wood material elements in the same way as for the comparison data sets, and in which one of the classifications is assigned to each test data set with the trained neural network.

Thus, by means of the described method—similar to character recognition—a classification, for example a place of manufacture or a period of manufacture, can be assigned to a plurality of comparison images during the training of the neural network. The trained neural network is then used to assign a test image to a classification. The identification therefore only consists of the classification, without a clear assignment with a specific wood-based panel.

According to the invention, the technical problem outlined above is also solved by a method for identifying wood-based panels, in which at least one comparison image is acquired for a predetermined section of a side edge of each wood-based panel, in which a comparison data set is determined from the comparison image on the basis of the structure, in particular on the basis of the geometry, the topography and/or the distribution of the wood material elements, in which a neural network of a machine learning system is trained with the comparison data sets with the specification that each comparison data set fed in is different from all the other comparison data sets, in which, after completion of the training, a mathematical comparison value, for example a number or a vector, is generated and stored for all the comparison data sets, is generated and stored, in which, at a second time, a test image is recorded for the predetermined section of a side edge of a wood-based panel, in which a test data set is determined from the test image on the basis of the structure, in particular on the basis of the geometry, topography and/or the distribution of the wood-based panel elements in the same way as for the comparison data sets, in which a mathematical test value, for example a number or a vector, is generated and stored for each test data record with the trained neural network, and in which the tested wood material panel is identified as the wood material panel for which the comparison data record was generated if the mathematical test value matches a comparison value.

Thus, similar to face recognition, a Siamese neural network is used to determine a match between a test image and one of the comparison images.

A Siamese neural network consists of two identical subnetworks, also known as twin networks, which are connected at their outputs. The twin networks not only have an identical architecture, but also share the same thresholds and weights. They work in parallel and are responsible for creating vector representations for the inputs. Ultimately, the respective numerical values or vectors calculated by the neural network are compared with each other—similar to an algorithm.

In practice, the two neuronal networks can also not be used in parallel in terms of time; instead, one neuronal network is first trained with a large number of comparison images. The structure of the neural network determined by the training, especially with regard to the threshold values of the individual neurons and the weighting factors of the connections between the neurons, is stored and can be transferred to another neural network or the other of the Siamese neural networks.

The comparison values in the form of numbers or vectors determined at intervals after completion of the training are stored in a database for later comparison with test values. For this purpose, each new wood-based panel is recorded with comparison images during production, the calculation of the numerical values or vectors is carried out with the trained network and saved. The same procedure is followed with the comparison images that were used for training the neural network. The numerical values or vectors for these wood-based panels are calculated and stored in the same way.

When checking whether a test image corresponds to a comparison image, such a neural network constructed in the same way is then used to calculate a test value in the form of a number or a vector from the test image or the test data set. The test value is then compared with the comparison values in the database and if there is a sufficient match, the Siamese neural network arrives at an identification of a wood-based panel.

In a preferred manner, a combination of a classification by the first-mentioned method and a subsequent identification by the second-mentioned method is used. In this way, a wood-based panel to be tested is first assigned to a classification, for example a place of manufacture, by means of the test image. Since a limitation of the number of possible comparison images is thus achieved, a smaller number of comparison images can be used for the training of the neural network for each of the possible classification units, here the manufacturing locations, wherein the accuracy and the hit rate can be improved.

In the aforementioned methods, a hit rate, i.e. the number of correct assignments as a proportion of the total assignments, in the range of greater than 80%, preferably greater than 90%, is sufficient for good functioning, although the highest possible hit rate is desired.

In a further preferred manner, the method is complemented by the following steps. A characterisation data set is determined and stored for the plurality of wood-based panels, preferably at the beginning of the method, wherein each comparison data set is linked to the characterisation data set for the respective wood-based panel and wherein the characterisation data set linked to the comparison data set is assigned to the tested wood-based panel if the test data set matches a comparison data set.

Both data sets can be stored separately and linked by means of pointers, but the data can also be stored as one data set and linked in this respect.

The tested wood-based panel is thus characterised by further data and information and the information stored in the characterisation data set can be used for further logistics or further processing.

As characterisation data, one or more of the following data can be written into the characterisation data set at the beginning or supplementary at a later time:

- Material information on the type of wood or wood species of the wood-based materials used,
- Material information on the formulation of the binders and other additives used,
- Technical data sheets and laboratory protocols
- Production parameters such as temperature, pressure and time course of the pressing process,
- Production date, production time and production location,
- Dimensions or format, in particular external dimensions and layer thicknesses,

- Type of coating or decoration applied,
- Certifications of the board for the wood used according to the FSC and PEFC standards for sustainable forest management and corresponding ISO standards,
- Certifications of the panel with regard to the release of volatile substances according to TSCA Title VI, CARB2 and CE,
- Storage locations and storage times as well as transport routes and transport times,
- Authorisation information for a subsequent readout of the data records.

The identification described above can thus lead to an additional assignment of at least one date of the characterisation data to a tested wood-based panel. The assignment can thus be a classification in which a production location, production date, production time and production plant and/or a type of wood or another characteristic property of the tested wood-based panel is assigned. This property can be assigned to a multitude of wood-based panels, which are thus classified.

Preferably, when the wood-based panel is separated into at least two partial formats, at least one datum characterising the processing step of separating the wood-based panel is added to the characterisation datum. The at least one additional datum may contain the time of processing and/or the new dimensions of the partial formats. The other unchanged side edges remain linked to the previous comparison images and comparison data sets, which, however, must also be linked to the changed characterisation data set.

The characterisation file assigned to a tested wood-based panel with the classifying and/or further identifying information can be linked and presented with further data in various ways in the utilisation chain from the manufacturer to the end customer.

It is assumed that the test image is recorded on site, in particular at an end customer, preferably with a mobile device such as a smartphone. The application (app) used for capturing the test image is provided by the manufacturer of the wood-based panel so that a direct data connection can be established with one or more servers of the manufacturer. After one of the previously described alternatives or successively performed analyses, a characterisation or identification of the wood-based panel then takes place, so that the manufacturer can, on the one hand, collect data about the current location, the logged-in user and/or the type of use. On the other hand, the manufacturer can determine further data about this wood-based panel and present it to the user via the application (app). In both cases, there is an added value that is made possible by using one of the described methods.

Preferably, further product suggestions matching the wood-based panel can be presented to the user. For example, suggestions for further suitable products can be displayed that can be used with the present wood-based material panel, in particular taking into account the decor associated with the wood-based material panel. The suggestions can also include other wood-based panels, laminates or flooring panels.

In addition, inspirations for the user can be displayed, for example photos of room situations and/or furniture in which the wood-based panel has been or is to be installed.

Furthermore, business information can also be linked to the characterisation or, if necessary, identification of the wood-based panel. For example, the transmission of an invoice from the dealer or the manufacturer can be linked to the recording and analysis of the test image or also a complaint processing. In addition, a proof of originality in the form of a certificate of authenticity can be transmitted.

Likewise, the purchasing behaviour of the end user, for example a carpenter, can be recorded when the wood-based panel has been scanned or recorded. This can be used to send individualised offers, product news or similar. In this way, the manufacturer or also a dealer can be provided with data about the use, the time of use and the type of use of the wood-based panels. Thus, among other things, information about the ordering behaviour and about storage times at dealers and end users until processing can be recorded.

BRIEF DESCRIPTION OF THE DRAWINGS

In the following, the invention is explained by means of embodiment examples with reference to the drawing. The drawing show FIGS. 1 to 4 a schematic representation and tables for an example of a method according to the invention with application to a section of a side edge of a wood-based panel and evaluation of geometric variables of the chip distribution, FIG. 5 a schematic representation for a further embodiment of a method according to the invention with application of four sections of a side edge of a wood-based panel, FIG. 6 a schematic representation for a further embodiment of a method according to the invention with application of two sections at each corner of a wood-based panel, FIG. 7 a schematic representation for a further embodiment example of a method according to the invention with application of a plurality of sections to a side edge of a wood-based panel, FIG. 8 a schematic representation for a further embodiment of a method according to the invention with application to a section on a side edge of a wood-based panel and evaluation of a grey-scale grid of the chip distribution, FIG. 9 a schematic representation for a further embodiment of a method according to the invention with application to a section on a side edge of a wood-based panel and evaluation of height profile data of the chip distribution, FIG. 10 a schematic representation for a further embodiment example of a method according to the invention with an evaluation of data sets of the chip distribution with the aid of a training of a neural network with a plurality of comparison data sets, FIG. 11 the neural network shown in FIG. 10 during a review of a test data set, FIG. 12 a schematic representation for a further embodiment example of a method according to the invention with an evaluation of data sets of the chip distribution with the aid of a training of a neural network with a plurality of comparison data sets, FIG. 13 the neural network shown in FIG. 12 during a review of a test data set, FIG. 14 an example of detection of the surface structure by means of a mechanical probe, and FIG. 15 a plate to be measured with coordinates drawn in.

DESCRIPTION OF THE INVENTION

FIGS. 1 to 4 show a first example of a method for identifying wood-based panels.

Figure 1:
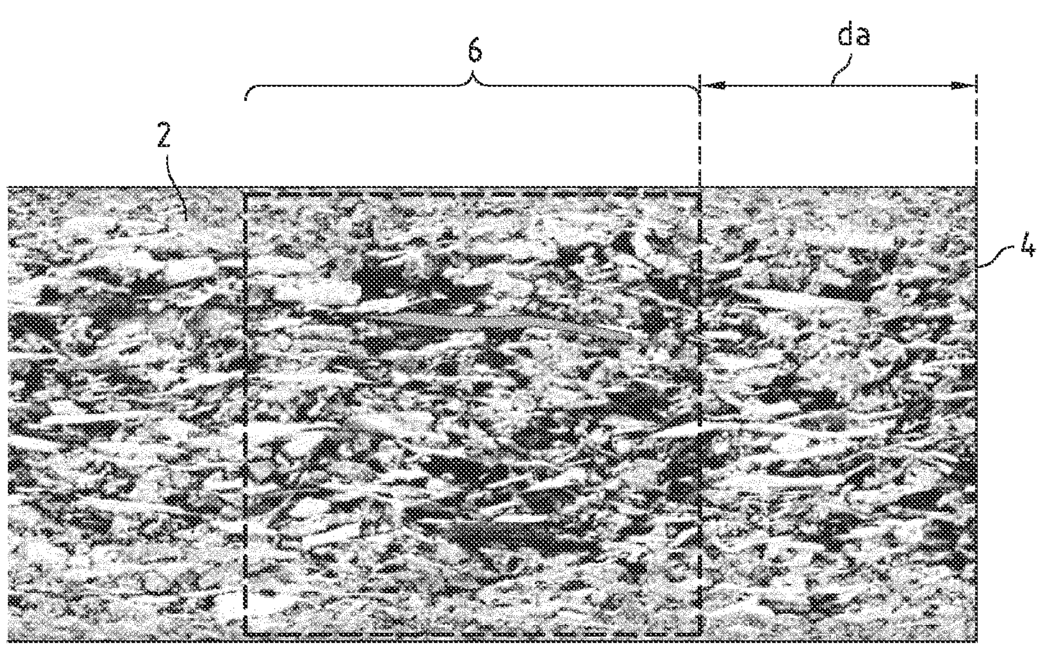
Figure 2:
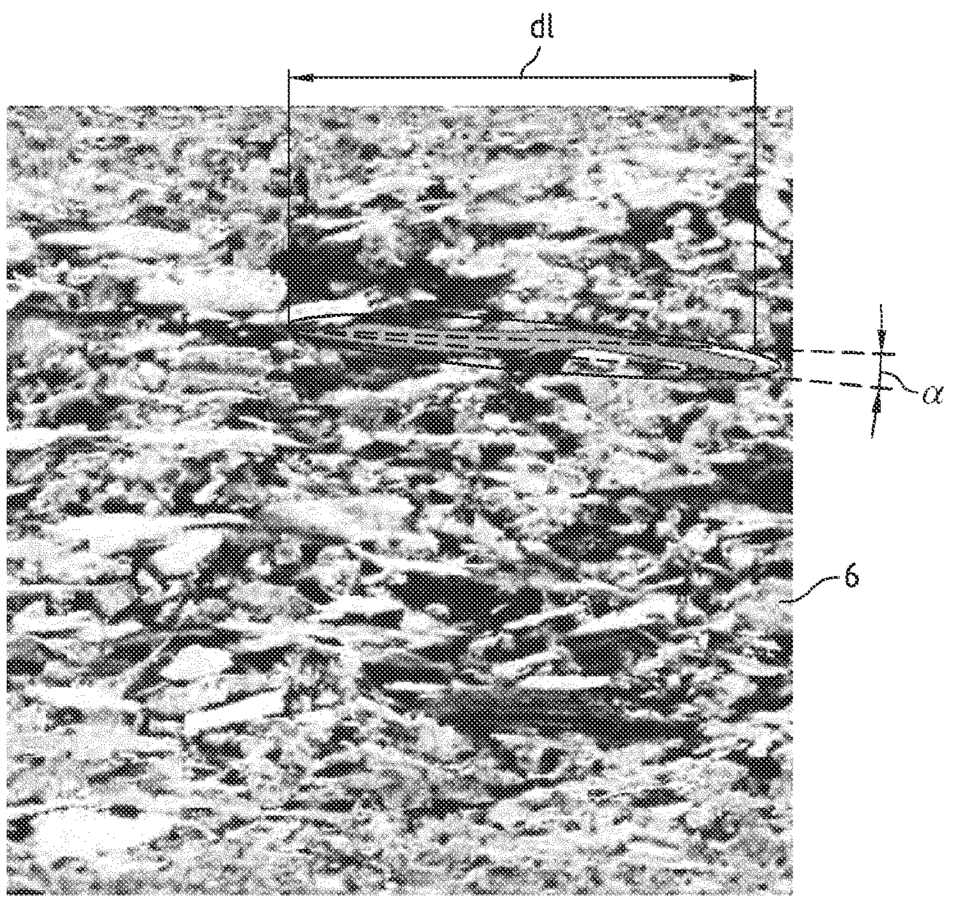

FIG. 1 shows a photograph of a piece of a side edge 2 of a wood-based panel in a side view. At the right edge of the view is a right-angled corner 4 which can be used as a reference for a dimension “da” to define the position of a section 6. The section 6 is shown with a dashed guide line, but this is not applied to the side edge itself. The side edge 2 is not further printed or otherwise marked. FIG. 2 shows the section 6 in a separate view In a further step of the method, a comparison image for section 6 of side edge 2 is now acquired and evaluated with a camera not shown. For this purpose, conventional image analysis software is used, such as OpenCV, scikit-image, Google Cloud Vision API, Microsoft Computer Vision API, vlfeat, dlib, Matlab Image Processing Toolbox, etc., and a number of individual wood material chips are detected. The outlines of the detected chips are partly determined by the software based on predefined criteria such as size or area. This is shown as an example for a long chip in FIGS. 1 and 2, whose surface is marked by a constant grey colouring.

Figures 3, 4:
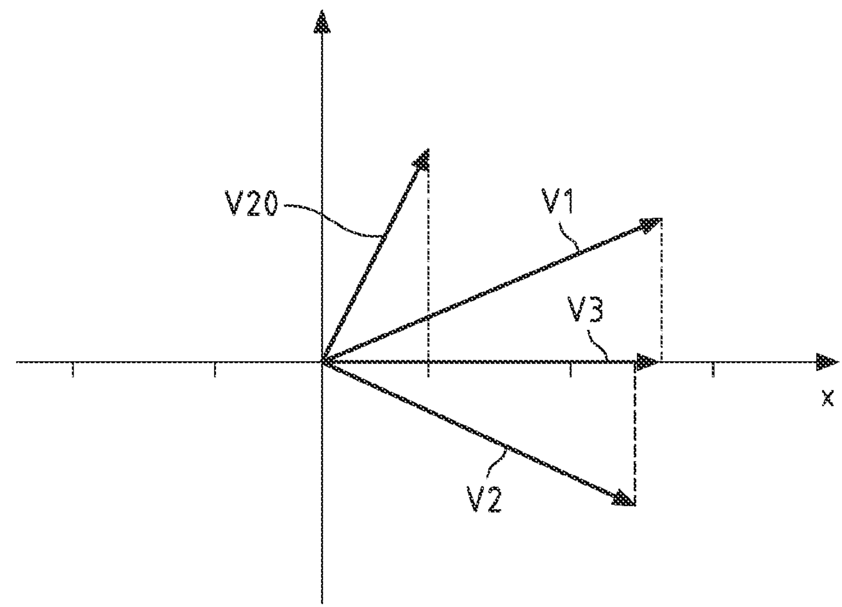

As shown in FIG. 2 for the selected chip, the detected chips are measured according to length dl and angle $\alpha$ of the orientation of the chips in relation to the direction of extension (horizontal in FIG. 2), the corresponding data for N=20 chips are partially listed in FIG. 3 as a table.

FIG. 4 shows the graphical representation of the data according to the table in FIG. 3, where the length dl in the direction of the x-axis and the angle $\alpha$ relative to the x-axis are drawn as vectors. The corresponding vectors $v_1$, $v_2$, $v_3$ and $v_{20}$ are drawn in FIG. 4. By projecting the vectors onto the x-axis, taking into account the cosine value to the angle $\alpha$ and forming the absolute value (magnitude), the values magnitude dx in the right column of the table in FIG. 3 are then obtained.

An advantage of the magnitude of the values dx(N) is that the value is the same regardless of the orientation of the wood-based panel when the image is taken.

If one then forms the sum of the amounts dx over N=1 to 20, a specific value for the section 6 results, which enables the identification of the wood-based panel. Thus, in the presented and described method, a comparison data set, here as the sum of the values N=1 to 20 over the amounts dx(N) as well as the individual values dx(N) from the comparison image is determined and stored based on the geometry of the wood-based material elements of the chips.

At least at a later point in time after production, i.e. for example during storage in the production plant, during transport and further storage and/or during use of the wood-based panels for further processing, for example as a furniture panel, a test image is recorded for the specified section of the side edge of a wood-based panel.

The test image is subjected to the same analysis as previously explained with reference to FIGS. 1 to 4 and a test data set is determined from the test image on the basis of the geometry of the wood-based material elements (chips, fibres) in the same way as for the comparison data sets. Subsequently, the test data set is compared with the comparison data sets of the plurality of wood-based panels stored in the database. The tested wood-based panel is then identified as the wood-based panel for which the comparison data set was generated if the test data set matches a comparison data set.

The test image is preferably taken with the same camera and in the same exposure situations. However, the method can also be so robust against fluctuations that, for example, a permanently installed camera takes the comparison image after the production of the wood-based panel, while the test image can be taken at a later time with a mobile camera, in particular also by means of a camera of a smartphone.

The database is generally stored on a server that is connected via a local network of the manufacturing site and/or via the Internet to the computing units for the creation of comparison data sets and the computing units for the creation of the test data sets and enables data exchange.

Figure 5:
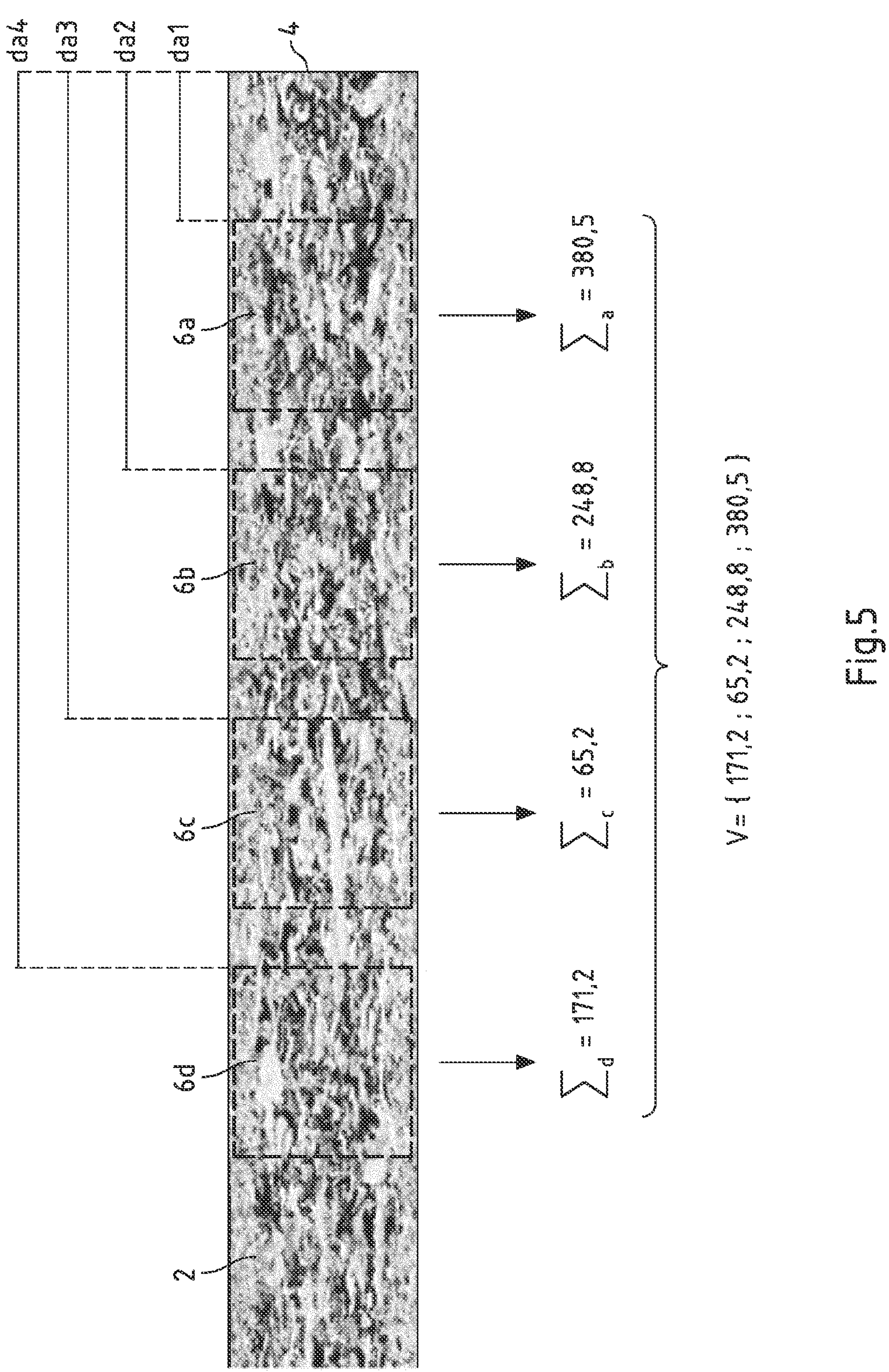

FIG. 5 shows a further embodiment example of a method for identifying wood-based panels, in which, in comparison with the example according to FIGS. 1 to 4, a total of four sections 6*a*, 6*b*, 6*c* and 6*d* are defined, which are spaced apart from the corner 4 by the distances $da_1$, $da_2$, $da_3$ and $da_4$.

Comparison images are then taken for the four sections 6*a*, 6*b*, 6*c* and 6*d* on the side edge 2 and a sum $\Sigma_a$, $\Sigma_b$, $\Sigma_c$ and $\Sigma_d$ is formed for each section 6*a*, 6*b*, 6*c* and 6*d* in the manner explained previously. The numerical values of the four sums $\Sigma_a$, $\Sigma_b$, $\Sigma_c$ and $\Sigma_d$ are then written in the order of the sections into a 4-dimensional vector V, which forms the comparison data set.

During a subsequent test of a wood-based panel, the four sections positioned in the specified sections $da_1$, $da_2$, $da_3$ and $da_4$ are then photographed in the same way at a specified side edge and evaluated as described before, and a vector V is formed as an test data set. This test data set is then compared with the comparison data sets stored in the database. If there is a match between the test data set and one of the comparison data sets, the tested wood-based panel is then identified as the wood-based panel for which the comparison data set was generated.

The comparison data set and the test data set have thus been determined as a sequence of structural values $\Sigma_a$, $\Sigma_b$, $\Sigma_c$ and $\Sigma_d$ for a given proportion of the wood-based material elements.

Figure 6:
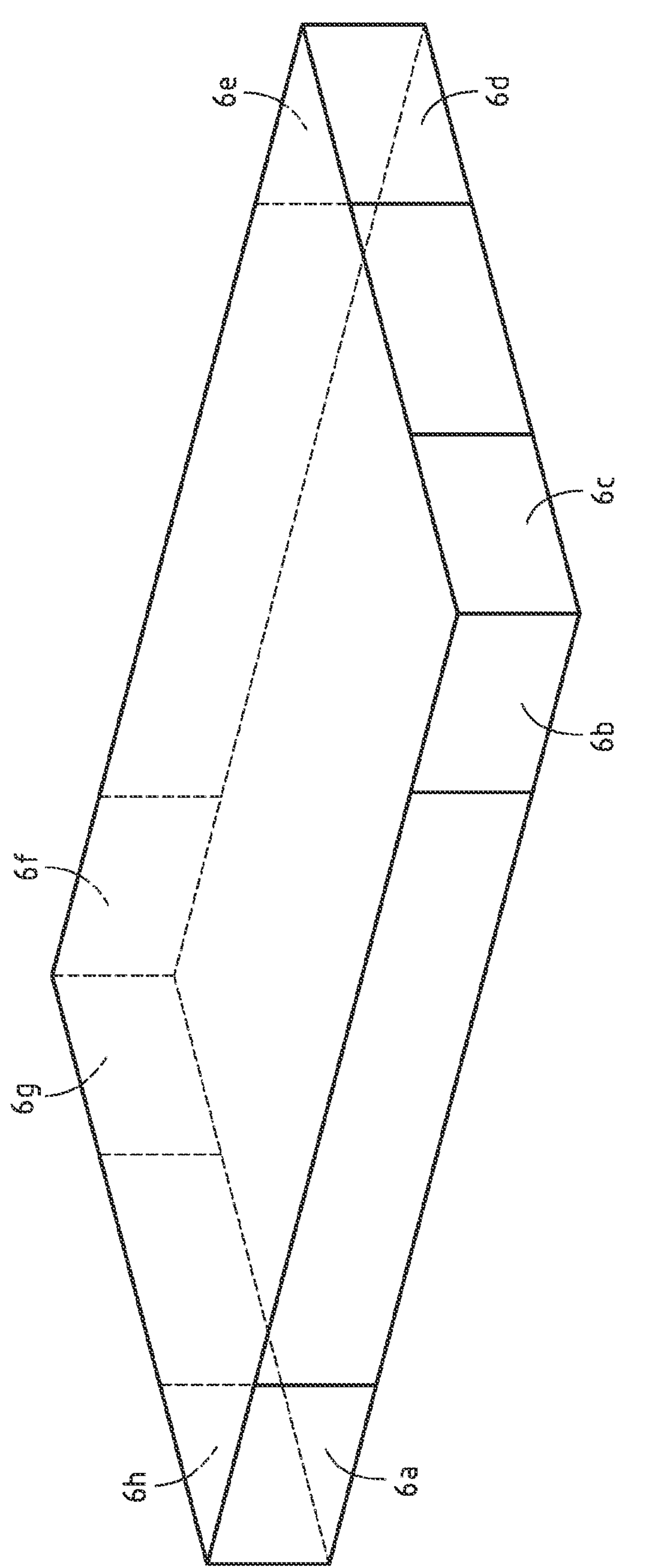

FIG. 6 shows another embodiment of the method for identifying wood-based panels, in which a section is defined at each of the four corners of a rectangular wood-based panel at each of the two adjacent side edges, presently adjacent to the corner with a value for the distance da equal to zero. Thus, eight comparison images for eight sections 6*a* to 6*h* are generated and further processed.

In this way, each wood-based panel is linked to a comparison image so many times that each wood-based panel can be identified in a simple way, regardless of its position. Therefore, if a test image is taken and a test data set is determined for a test procedure for only one of the eight sections with comparison data sets, then the wood-based panel can still be identified.

Figure 7:
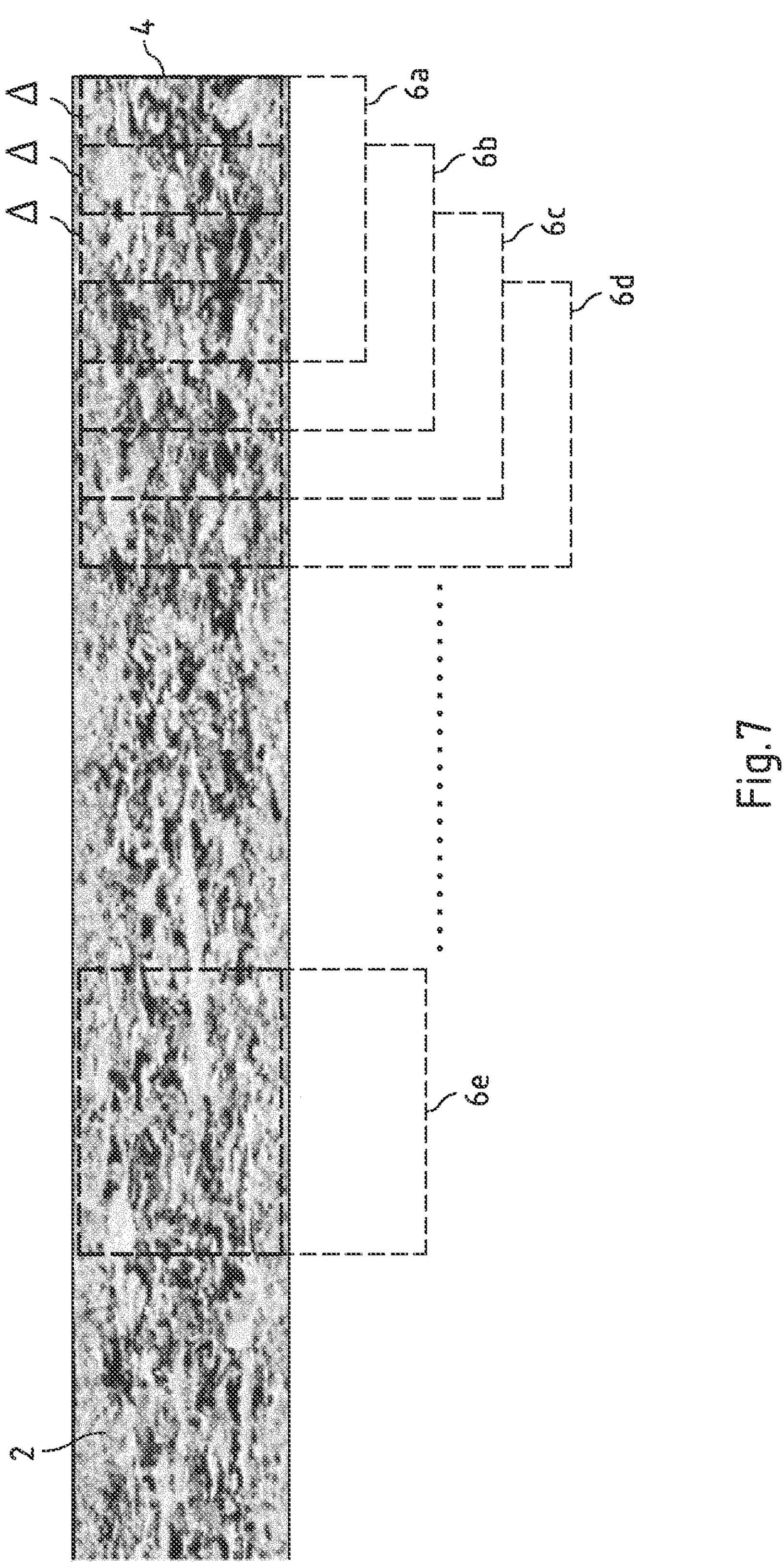

FIG. 7 shows another embodiment of the method in which comparison images for a plurality of sections 6*a* to 6*e* are taken at predetermined distances $\Delta$ along at least part of a side edge 2 and comparison data sets are generated for the comparison images. The predetermined distance may be adapted to the resolution of the comparison images or to the spatial resolution of a grey scale distribution determined from the comparison images, see the discussion of FIG. 8 below.

At the second time, a test image can then be recorded in the area of the plurality of sections of the side edge in accordance with the grid, i.e. preferably arbitrarily, without the need for an exact positioning of the recorded test image. Subsequently, a test data set is again determined for comparison with the comparison data sets. Further processing then corresponds to the previous examples.

Since the structures of the side edges themselves are used for identification, it is necessary for identification that the structures remain intact or are only changed to a small extent. However, if the structures are changed too much, a new creation of comparison images and comparison data sets is necessary. Therefore, in a further embodiment of the method, it is provided that after machining at least one side edge of the wood-based panel, at least one comparison image is recorded for this at least one side edge for at least one section and a comparison data record is determined. In this case, machining means in particular a removal of material, for example milling or grinding.

In particular, this also applies if the wood-based panel is separated and two or more partial formats are cut. Then, in a further embodiment of the method, it is provided that after one of the wood-based panels has been separated into at least two partial formats, at least one comparison image is recorded for at least one section on at least one newly created side edge of the partial formats for each resulting partial format, and a comparison data set is determined.

Previously, the embodiments of the method were described in which 2D cameras were used and in which the captured structure of the wood-based material is analysed in each image, in which structure values are determined from the structure of the wood-based material elements by the length as the longest extension in the shape and by the orientation, i.e. the direction of the longest extension in the shape of the wood-based material elements in relation to the dimensions of the recorded section of the side edge, the comparison data sets and test data sets. Furthermore, information for the comparison data sets and test data sets can also be obtained alternatively or additionally by the shape, by the circumference and/or by the area of the wood-based material elements.

The 2D images, i.e. the comparison images and the test images, can be taken with conventional cameras, for example general CCD cameras, single-lens reflex cameras (DSLR), mirrorless system cameras (DSLM) or cameras of mobile devices such as smartphones or tablets. However, a 2D image can also be obtained with a spectral camera that determines spectral data for each pixel. The image can be stored in the RGB colour space with the values for red (R), green (G) and blue (B) or in the L*a*b* colour space with pixel values L*, a* or b* for brightness (L*), red-green colour intensity (a*) and blue-yellow colour intensity (b*) or in other colour spaces.

Figure 8:
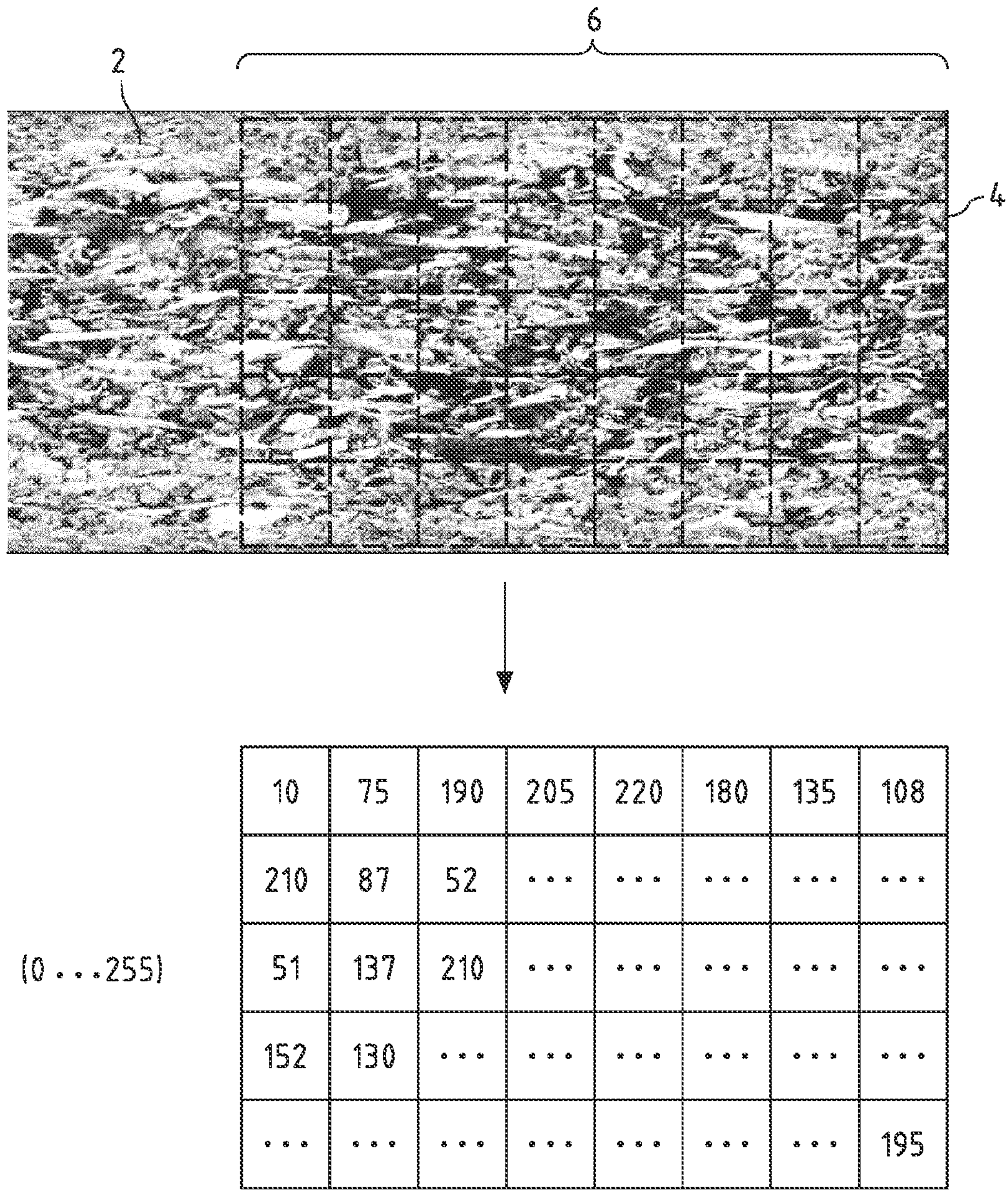

Another embodiment features a different image analysis, in which the existing structures are not determined, but in which—as shown in FIG. 8—each image of the section 6 adjacent to the corner 4 of the side edge 2 is divided into pixel areas according to a predetermined grid with respect to the horizontal orientation of the section 6 in FIG. 8. Each square of the grid comprises a plurality of pixels of the captured image and represents a pixel area. Each pixel area is then assigned a pixel value calculated from the individual pixels and averaged from the brightness values and the comparison data set or the test data set is then determined as a sequence of averaged pixel values 10, 75, 190, 205, . . . in a value range of (0 . . . 255) in a predetermined order from the pixel areas. This again results in a vector V with a plurality of values, which is shown in FIG. 8 with a series of values in sections.

Instead of a brightness value, at least one colour value of a colour channel can also be calculated as a pixel value. The comparison data set determined in this way and the test data set are then processed in the manner described above to perform the procedure.

Figure 9:
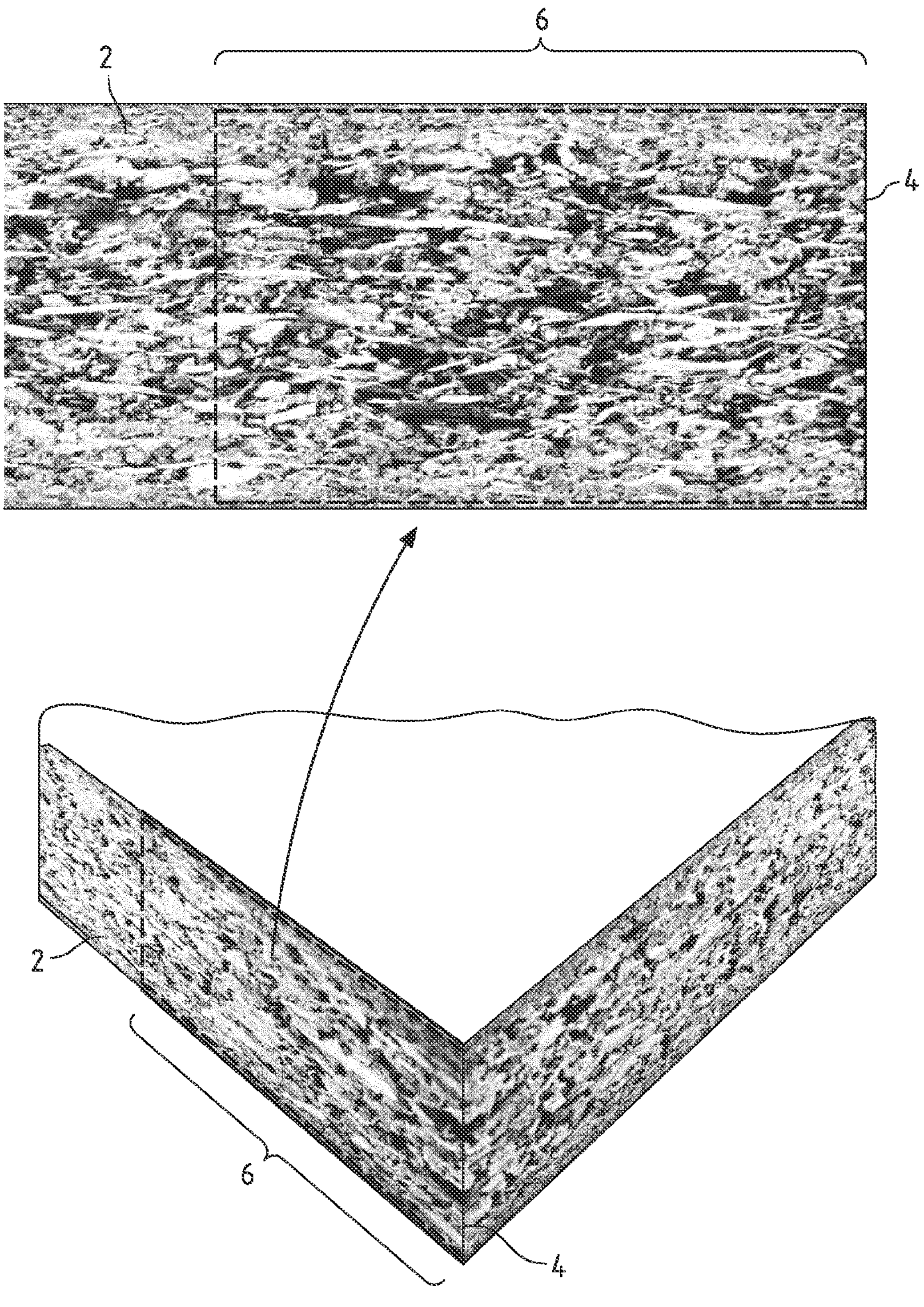

A further embodiment of the method for identifying wood-based panels is shown in FIG. 9. The side edge 2 of the wood-based panel is again shown as in FIG. 1, the selected section 6 is located adjacent to the corner 4 of the wood-based panel.

In the method, the images, i.e. the comparison images and the test images, are each recorded with a 3D camera, which is designed as a LIDAR camera as a stand-alone camera or as part of a smartphone or as a stereoscopic camera with two cameras.

The topography is then determined for each image and a profile reflecting this topography is generated from the topography. From the profile, different parameters such as the contour line profile as a whole or in sections, a triangular mesh or sections of the triangular mesh can be derived as topography values and the comparison data set or the test data set are then determined from the topography as a sequence of topography values in a predefined order.

Starting from an elevation profile, the shape of the contour lines can be analysed directly. Several black and white images can be generated, wherein a height threshold value is specified for each image, and areas whose height is below the threshold value are coloured black and those whose height is greater than or equal to the threshold value are coloured white. From this, properties of the binary image elements can be evaluated, such as the largest contiguous area, the distribution of the sizes of individual areas and/or the ratio of major to minor axes in individual areas.

Similarly, a depth image can be transformed into a grey-scale image composed of pixels, each describing a depth of the surface profile. For example, a low value close to 0 can indicate areas that are close to the measuring camera, i.e. following an imaginary perfectly smooth surface. Higher values >0 can stand for a deepening such as a free space between two fibres. Of course, the scale can also be reversed.

The three-dimensional structure can also be analysed directly, without conversion to a two-dimensional equivalent. For this purpose, various 3D parameters can be used, in particular in accordance with the EN ISO 25178 standard. For the evaluation of a three-dimensional surface, parameters and measurement methods are specified by which the surfaces can be measured and thus used for identification.

In addition to evaluating contour lines of the topography, as mentioned, a digital model can also be created from a large number of individual points representing the surface of the side edge structure. This can be done either by triangular meshing (Triangulated Irregular Network) or by approximating a rectangular grid. This elevation model is intersected with a horizontal plane at the desired elevation, the result is the contour line.

Amplitude parameters can be used as further parameters, which, for example, describe the height structure of the surface with individual values and go back to a 2D profile section evaluation. They are transferred from the linear 2D to the areal 3D evaluation. Further parameters are an area-related arithmetic centre roughness (Sa), an area-related core roughness depth (Sk), an area-related averaged roughness depth (Sz) or an area-related square centre roughness value (Sq). Since the surface of the side edge of a wood-based panel can assume different values in these parameters, one or more of these parameters can be determined in a grid corresponding to the grid according to FIG. 8 for each field of the grid, the numerical values of which are written together into a specific vector.

Further spatial parameters describe the texture pattern of the surface. The autocorrelation function ACF is used for this and the autocorrelation length (Sal) and/or the texture-aspect ratio (Str) can be used as parameters, again preferably in a grid.

Furthermore, hybrid parameters are known that combine vertical and spatial parameters to determine the slope. The mean square surface slope (Sdq) and/or the ratio of the real surface to the measuring surface (Sdr), again preferably arranged in a grid, can be used as parameters.

In the previously explained methods, the test data sets are compared with the comparison data sets, preferably using an algorithm to calculate a mathematically defined distance between the comparison data sets and the test data sets, in which the distance is compared with a threshold value, and in which a match is determined if the distance is less than the threshold value.

The algorithms can be formulated in different mathematical ways and the distances can be calculated by different approximations.

A first common distance metric is, for example, a Root Mean Square Error (RMSE), where a difference of the characteristic values between the test and the comparison data is calculated for each element, this difference is squared, the squared differences for all characteristics are added up and then the root of the sum is taken.

Alternatively, a cosine similarity C can be used, in particular as follows. Values of −1 indicate a large difference, values close to 1 indicate a high similarity.

The previously described algorithms realise a direct mathematical relationship between the input values and the output value, they can be called deterministic to that extent and can be calculated directly with a programme.

In an alternative embodiment of the described variants of the method, a machine-learning neural network can also be used. Different types of neural networks can be used in the described method, for example also Convolutional Neural Networks (CNN).

In general, artificial neural networks can be based on the interconnection of many McCulloch-Pitts neurons or slight modifications of them. In principle, other artificial neurons can also find application in artificial intelligences, for example the high-order neuron.

Using a graph, see FIGS. 10 and 11 below, layers can be represented with neurons as nodes (circles) and their connections as edges (connecting lines). The input layer is also represented as a layer of nodes. The rearmost layer of the network, whose neuron outputs are usually the only ones visible outside the network, is called the output layer. Layers in front of it are correspondingly called the hidden layer.

Machine learning techniques are then used to modify a neural network so that it produces associated output patterns (for example, yes/no match) for certain input patterns (comparison data sets). In supervised learning, the artificial neural network is given an input pattern and the output produced by the neural network in its current state is compared with the value it is supposed to output. By comparing the target and actual output, the changes to be made to the network configuration can be inferred and the neural network can be run through again in the opposite direction.

Training a new neural network with a large amount of data is computationally intensive and time-consuming. Especially in the area of recognising objects in images with Deep Learning, enormous computing power is needed to train the network with, for example, millions of images each for many training cycles (epochs). A Convolutional Neural Network (CNN) first learns to distinguish the relevant structures and shapes and then to derive and recognise less abstract objects from them.

For the training of a new neural network, it can therefore make sense to build on these already learned features of a fully trained network with the help of transfer learning. For example, the trained layers of a neural network are taken over and only the output layer is adapted to the number of object classes to be recognised in the new network and retrained.

The advantage is that the neural network can already recognise and distinguish shapes and structures, and it only has to learn a new assignment of object classes. The trained layers are either kept constant and only the output layer is retrained, or some or all layers are trained further on the basis of the current training status.

The method described above can now be implemented using a neural network in such a way that a neural network of a machine learning system is trained with the comparison data sets with the specification that each comparison data set fed in is assigned to a classification and that each test data set is assigned one of the classifications with the trained neural network.

Thus, the same classification is assigned to a plurality of comparison images, e.g. a place of production. This procedure corresponds to a character recognition in which differently written individual letters can each be assigned to a classification of a concrete letter by a trained neural network.

Furthermore, the method can also be carried out in such a way that a neural network of a machine learning system is trained with the comparison data sets with the specification that each comparison data set fed in is different from all other comparison data sets, in which, after completion of the training, a mathematical comparison value, preferably in the form of a number or a vector, is generated and stored for all comparison data sets, is generated and stored for all comparison data sets, in that a mathematical test value, likewise preferably in the form of a number or a vector, is generated and stored for each test data set with the trained neural network, and in that the tested wood-based panel is identified as the wood-based panel for which the comparison data set was generated if the mathematical test value matches a comparison value.

Here, a so-called Siamese neural network is used, in which two identically operating neural networks generate comparison and test values that can be compared with each other. In this case, an unambiguous assignment of a test image to a wood-based panel can be made on the basis of the comparison images. This procedure corresponds to that of a face recognition.

In a further preferred manner, the two described alternatives of the method are applied sequentially by performing in advance for one classification of the test image and by performing the method separately for comparison images of each of the available classifications.

Thus, the wood-based panel can first be assigned to a manufacturing location or a manufacturing plant by means of a classification. Afterwards, a Siamese neural network can be accessed that has been trained on wood-based panels that have been produced exclusively on this production line. In this way, a step-by-step and modular identification can be achieved.

Figure 10:
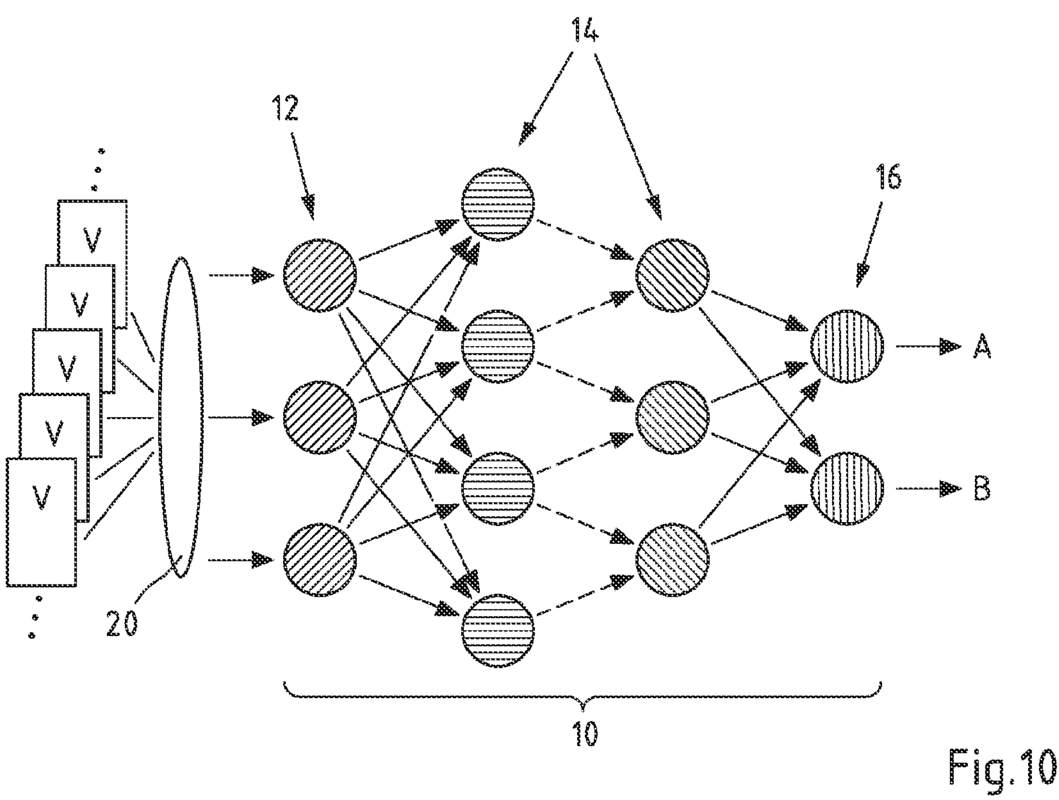

FIG. 10 now shows a schematic representation of a training of a neural network 10 comprising an input layer 12, hidden layers 14 and an output layer 16. A plurality of comparison data sets V are input to the input layer 12 via an interface 20, and training is performed with the proviso that each input comparison data set V is associated with a classification A or B. The training is performed with a large number of comparison data sets V, and the training is performed with a large number of hidden layers 14. Such training is performed with a large number of comparison data sets, for example 10,000 comparison data sets.

By feeding back the results of each training run, the training can be carried out by changing or adjusting the parameters of the neural network such as the threshold value of each node or neuron (circles in the hidden layers 14) and the weight factors $w_{ij}$ from neuron j to neuron i until a reliable classification of the comparison data sets can be ensured by the neural network.

Figure 11:
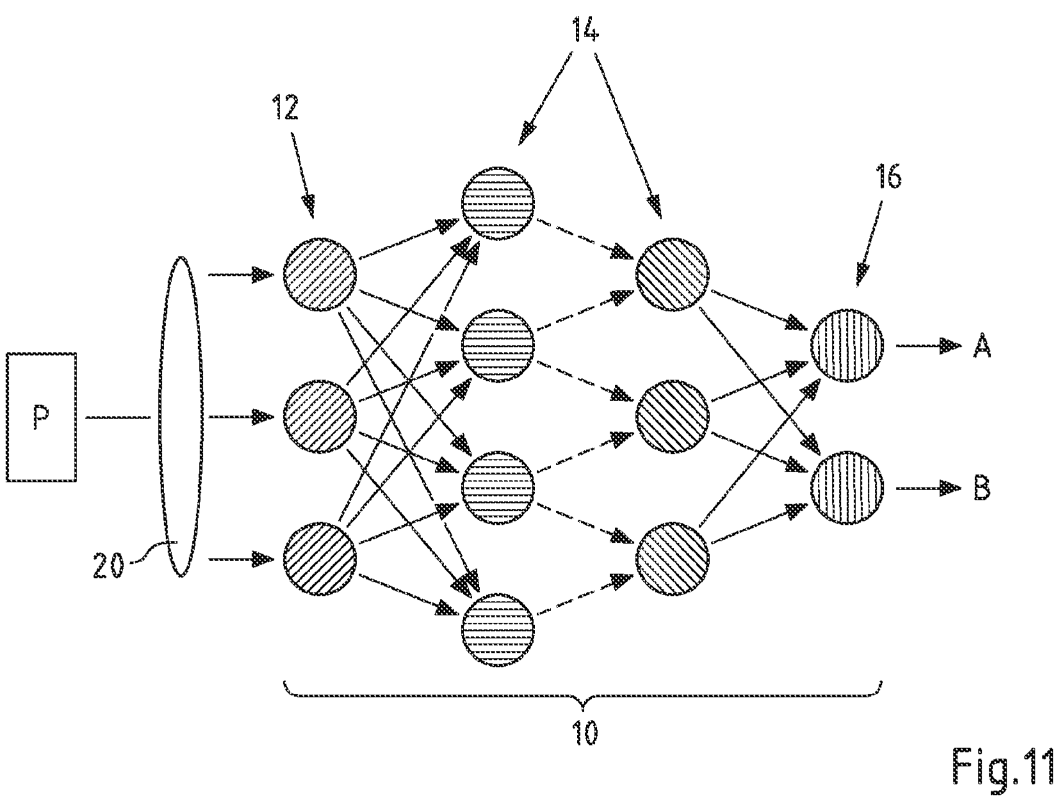

The neural network is thus set up in such a way that, according to FIG. 11, one of the classifications A or B is assigned to a test data set P with the trained neural network. The place of manufacture, the date of manufacture, the panel thickness of the wood-based panel or other general data can be used as classifications A and B. The neural network is thus set up so that, according to FIG. 11, a test data set P is assigned one of the classifications A or B with the trained neural network. A classification therefore comprises a plurality of associated wood-based panels, wherein the classification is regarded as a possible form of identification.

By training with a large number of comparison data sets, the neural network is trained in such a way that the wood-based panels to which the comparison data sets used for training belong can be classified by the trained network. Furthermore, wood-based panels whose comparison data sets have not been used for training can also be classified. In particular, this property of the trained network applies to wood-based panels that have been produced after training and can be assigned to one of the classifications.

Figure 12:
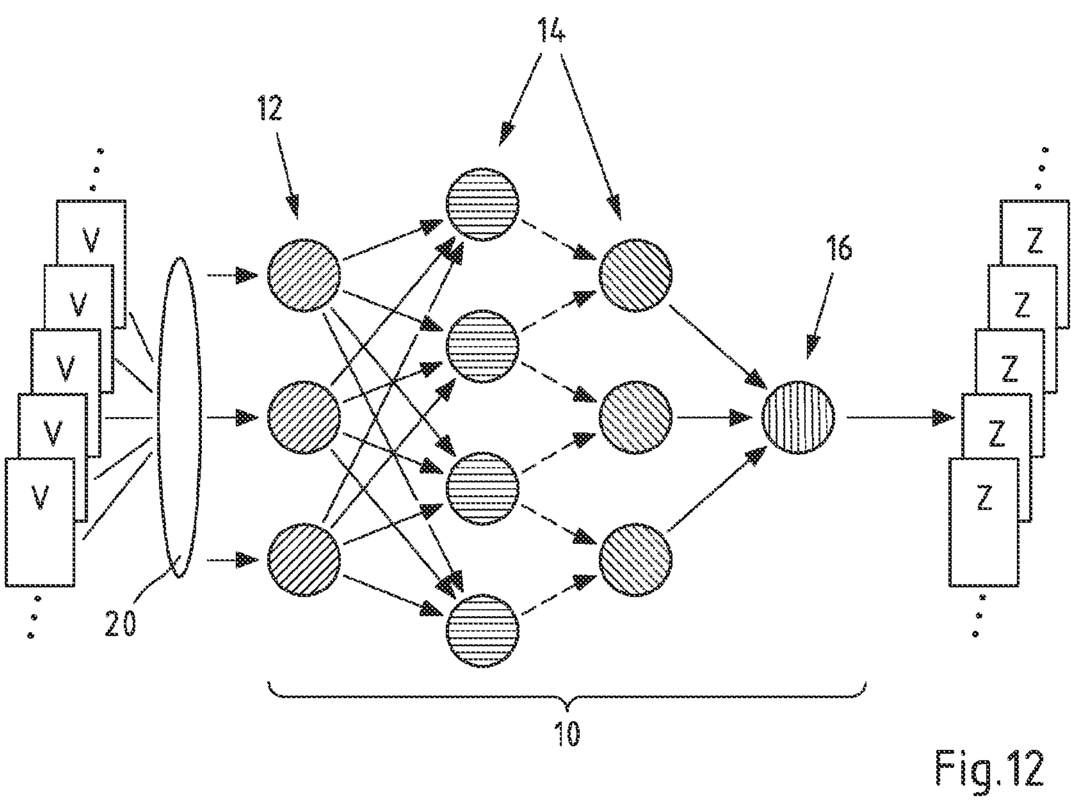
Figure 13:
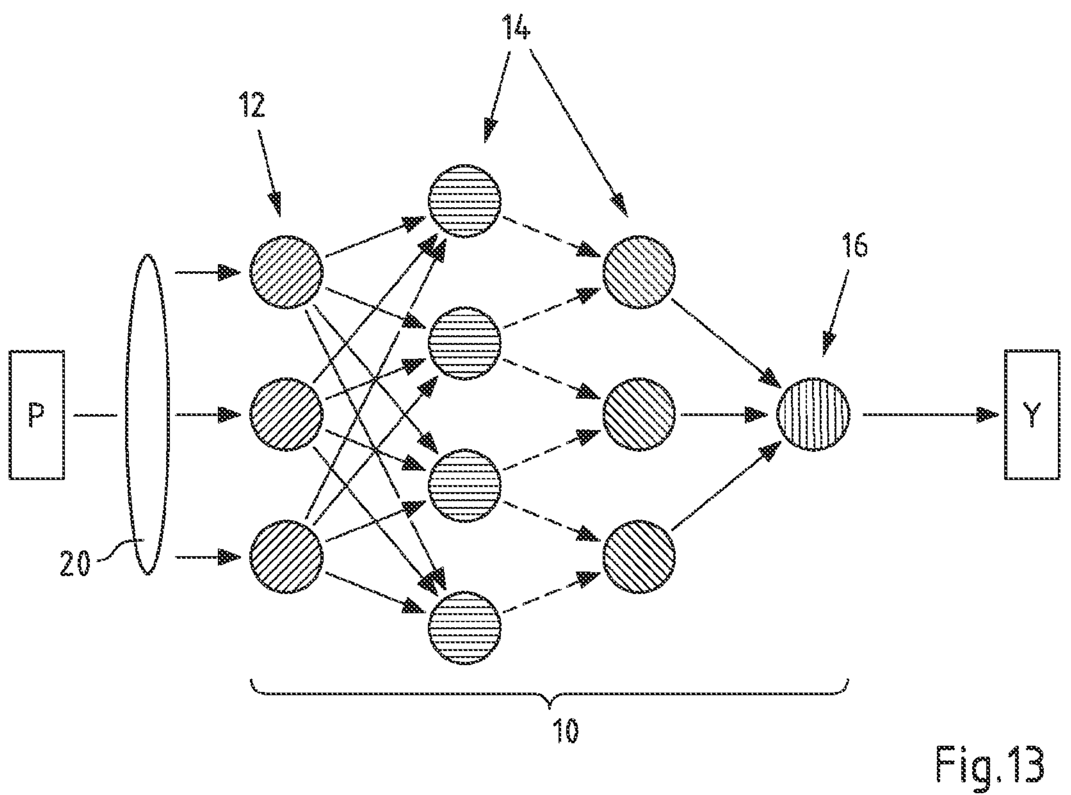

FIGS. 12 and 13 show another application of neural networks.

FIG. 12 schematically shows a neural network similar to FIGS. 10 and 11. The neural network is trained with the comparison data sets V with the specification that each comparison data set V fed in is different from all other comparison data sets. In addition, the neural network can also be fed two identical images with the specification that these are two identical images.

The number of comparison data sets is large and is, for example, in the range greater than 10,000. The neural network is modified during training in such a way that different comparison data sets can be distinguished and that, after completion of the training, a mathematical comparison value Z different from all other comparison values is generated and stored for all comparison data sets V. The comparison values Z of the corresponding wood-based panels are linked and stored. The comparison values Z of the corresponding wood-based panels are linked and stored.

The neural network was trained to compare a test image with the existing images and to determine whether the recorded test image shows an already existing panel. According to FIG. 13, this is done by generating a mathematical test value Y for the test data set of a wood-based panel to be tested, which is generated from the test image, using the trained neural network and storing it at least temporarily.

Subsequently, if the mathematical test value Y agrees with a comparison value Z, the tested wood-based panel is identified as the original wood-based panel associated with the comparison value Z.

Preferably, the greyscale data sets of the comparison images and test images are fed into the neural network as comparison data sets and test data sets, as explained in the context of, for example, FIG. 8.

Figure 14:
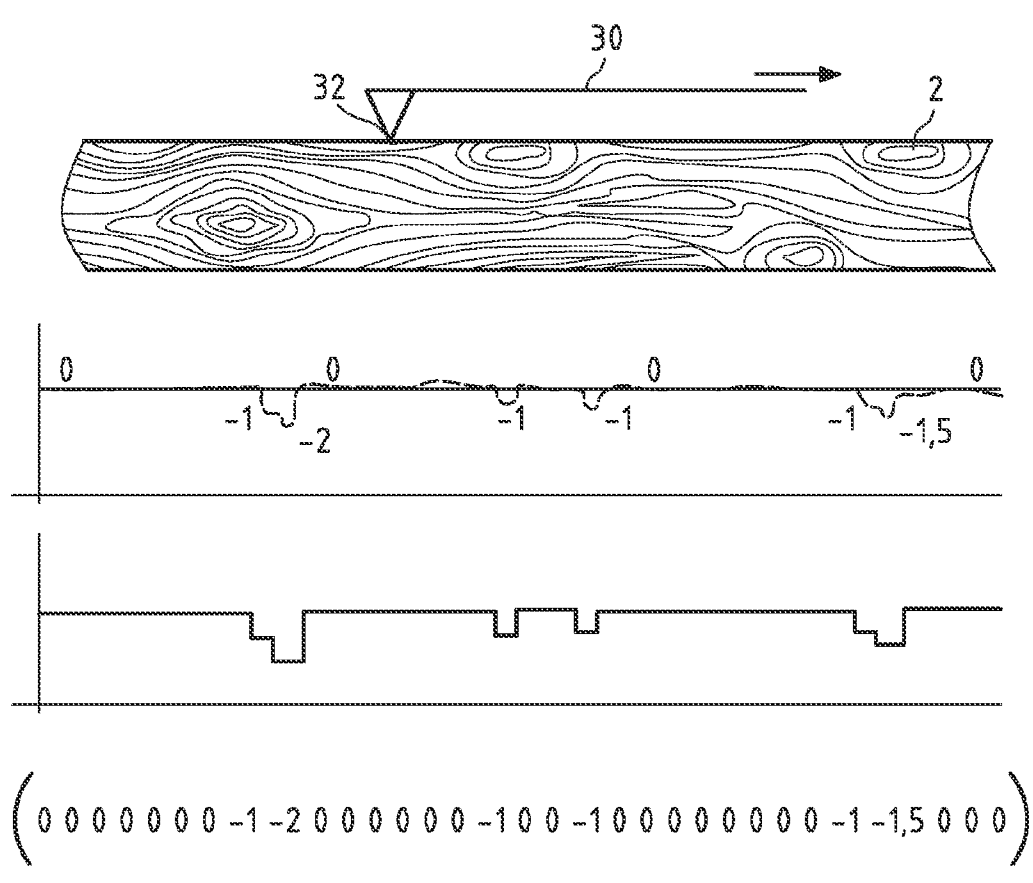
Figure 15:
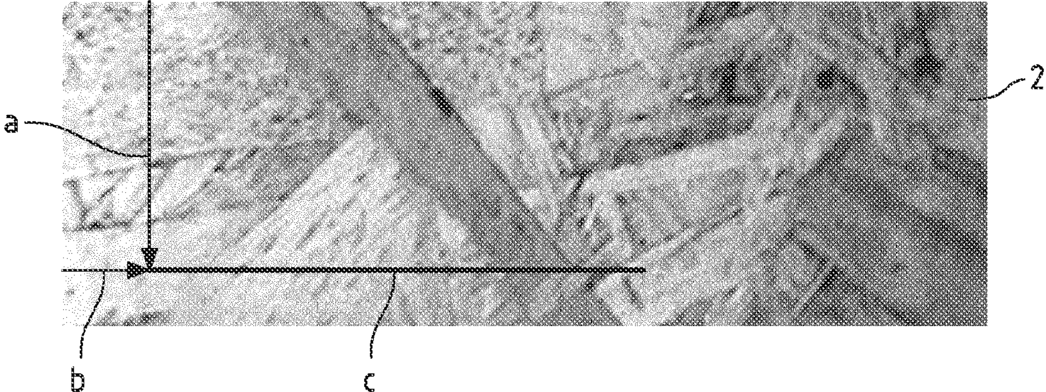

FIGS. 14 and 15 show a further example of the method described above, in which the surface structure of a wood-based panel is mechanically scanned and the topography is thus determined as a contour line profile. Devices that are also used for measuring surface roughness can be used for this purpose.

A mechanical probe 30, which has a probe tip 32, is pressed under a predetermined preload onto the surface of the side edge 2 to be measured and moved in a direction marked with an arrow. The deflection of the probe tip 32 is measured at predetermined intervals and quantified—in this case in units of 0.5. This results in a depth profile characteristic of the surface structure, which is recorded and stored graphically as an image and mathematically as a series of numbers (shown below in FIG. 14).

FIG. 15 shows the surface of a side edge 2 with lines drawn in to determine the position and the measuring distance. The arrows a and b, each with a predetermined length, mark the starting point of the measuring distance, which is marked with c and which also has a predetermined length.

In a preferred manner, a plurality of measurement distances $c_1, \ldots, c_n$ can be determined with a plurality of starting points, for example by a plurality of arrows $a_1, \ldots, a_n$. When these measurement distances have been measured, a matrix of the n vectors can be formed mathematically from the n different height profiles.

Comparison images and test images or the corresponding comparison data sets and test data sets can then be generated from individual vectors or from a plurality of vectors.

In all previously explained embodiments of the method, an identification of wood-based panels takes place. In a preferred manner, a characterisation data set is determined and stored for the plurality of wood-based panels in a method step. Each comparison data record is then linked to the characterisation data record for the respective wood-based panel and the characterisation data record linked to the comparison data record is assigned to the tested wood-based panel if the test data record matches a comparison data record. Thus, characteristic data can be assigned to the tested wood-based panel by means of the identification of the wood-based panel.

The characterisation dataset is linked to the comparison dataset and a database stores the comparison dataset and the characterisation dataset, either as separate datasets linked with pointers or as one combined dataset.

For example, at least one data entry selected from the non-exhaustive list of data entries is stored in the characterisation record:

Material information on the type of wood or wood species of the wood-based materials used, Material information on the formulation of the binders and other additives used, Technical data sheets and laboratory protocols Production parameters such as temperature, pressure and time course of the pressing process, Date and place of production, Dimensions or format, in particular external dimensions and layer thicknesses, Type of coating or decoration applied, Certifications of the board for the wood used according to the FSC and PEFC standards for sustainable forest management and corresponding ISO standards, Certifications of the panel with regard to the release of volatile substances according to TSCA Title VI, CARB2 and CE, Storage locations and storage times as well as transport routes and transport times, and Authorisation information for a subsequent readout of the data records.

With these data of the characterisation data set, the assigned wood-based panel can be characterised, wherein further data can be added in the course of the further treatment of the wood-based panel. Thus, the characterisation data can be determined after the production of the wood-based panel and can be taken into account during further processing and treatment.

In particular, when the wood-based panel is unravelled by a processing step, the characterisation data set of the unravelled wood-based panel is linked to the respective comparison data set for each partial format. Thus, the characterisation data set of the original wood-based panel is linked to the generated partial formats and, if necessary, data on the unravelling of the wood-based panel is added to the characterisation data. For this purpose, for example, the processing time and the new dimensions of the partial format are added to the characterisation data. The further comparison data of the unchanged side edges of the partial format are then also linked to the changed characterisation data set.

The invention claimed is:

1. A method for identification of wood-based panels, comprising:

capturing, for each wood-based panel of a plurality of wood-based panels, at least one respective comparison image of a predetermined section of a respective side edge of a respective wood-based panel at a respective first time;

determining and storing a plurality of comparison data sets by determining and storing, for each wood-based panel of the plurality of wood-based panels, a respective comparison data set from the respective comparison image captured for the respective wood-based panel based on a respective structure of a respective wood-based material of the respective wood-based panel;

determining, for each wood-based panel of the plurality of wood-based panels, a respective characterization data set;

linking each comparison data set of a plurality of comparison data sets to the respective characterization data set for the respective wood-based panel;

capturing a test image of the predetermined section of a respective side edge of a first wood-based panel at a second time, wherein the first wood-based panel comprises a first wood-based material, and wherein the second time is a time later than said respective first times;

determining a test data set from the test image based on a structure of the first wood-based panel;

comparing the test data set with the comparison data sets to identify a matching comparison data set; and assigning the characterization data set linked to said matching comparison data set to the first wood-based panel.

2. The method according to claim 1, wherein the respective characterization data set comprises at least one datum selected from the following list:

material information on a type of wood or wood species of the wood-based material used for the respective wood-based panel, material information on a formulation of a binder used for the respective wood-based panel, a technical data sheet and laboratory protocols, production parameters such as a temperature, a pressure, and a time course of a pressing process, a production date, a production time, and a production location, a dimension or a format, a type of coating or a decoration applied to the respective wood-based panel, a certification of the respective wood-based panel regarding the wood used therefor according to FSC and PEFC standards for sustainable forest management or corresponding ISO standards, a certification of the respective wood-based panel regarding emission of volatile substances according to TSCA Title VI, CARB2, or CE standard, a storage location, a storage time, a transport route, and a transport time, and authorization information for a subsequent readout of the respective characterization data set.

3. The method according to claim 2, further comprising:

separating at least one wood-based panel of the plurality of wood-based panels into at least two partial formats, wherein each of the at least two partial formats is associated with a characterization data set, wherein, after separating the at least one wood-based panel of the plurality of wood-based panels into the at least two partial formats, the characterization data set associated with the at least two partial formats is supplemented by the datum on the separation of the at least one wood-based panel into the at least two partial formats.

4. The method according to claim 1, wherein comparison images are taken for a plurality of sections on at least one side edge of the respective wood-based panel, and wherein the comparison data set is determined for each of the comparison images.

5. The method according to claim 4, wherein a respective test image is captured and a respective test data set is determined for one or more of the plurality of sections for which the respective comparison data set has been determined.

6. The method according to claim 4, wherein, for the plurality of sections, respective comparison images are captured, the plurality of sections being arranged in predetermined distances along at least part of the respective side edge of the respective wood-based panel;

wherein respective comparison data sets are generated for the respective comparison images; and wherein at the second time the test image is captured of the first wood-based panel in an area of the plurality of sections of the respective side edge of the first wood-based panel and a test data set is determined for the first wood-based panel for comparison with the comparison data set.

7. The method according to claim 1, wherein, after machining at least one side edge of the first wood-based panel, at least one comparison image is captured for at least one section of the at least one side edge of the first wood-based panel and the respective comparison data set is determined based on the at least one comparison image.

8. The method according to claim 1, further comprising:

separating at least one wood-based panel of the plurality of wood-based panels into at least two partial formats, wherein, after separating the at least one wood-based panel of the plurality of wood-based panels into the at least two partial formats, for each of the at least two partial formats for at least one section on at least one newly created side edge of the respective partial format, at least one new respective comparison image is captured, and a new respective comparison data set is determined, and wherein, for each partial format, each new respective comparison data set is linked to a respective at least one wood-based panel.

9. The method according to claim 1, wherein, for each comparison image and for each test image, a respective structure of the wood-based material of the respective wood-based panel is analyzed, wherein respective structural values are determined from a respective structure of wood material elements of the wood-based material by a shape, a perimeter, an area, a length, and/or an orientation of the wood material elements with respect to dimensions of the captured section of the respective side edge of the respective wood-based panel, and wherein the respective comparison data set or the test data set is determined as a sequence of structural values for a predetermined proportion of the wood material elements.

10. The method according to claim 1, wherein each comparison image and test image is divided into pixel areas according to a predefined grid in relation to an orientation of the predetermined section of a respective captured side edge, wherein each of the pixel areas is assigned a pixel value calculated from a plurality of individual pixels of the respective pixel area, and wherein the respective comparison data set or the test data set is determined as a sequence of pixel values in a predetermined order from the pixel areas.

11. The method according to claim 1, wherein, for each comparison image and for each test image, a respective topography is determined, wherein a contour profile, sections of the contour profile, a triangular mesh, or sections of the triangular mesh are derived from each respective topography as respective topography values, and wherein the respective comparison data set or the test data set is determined as a sequence of topography values in a predefined order from each respective topography.

12. The method according to claim 1, wherein an algorithm is used to calculate a mathematically defined distance between the comparison data sets and the test data set, wherein the mathematically defined distance is compared to a threshold value, and wherein, if the distance is less than the threshold value, a match is determined to be found.

13. The method according to claim 1, wherein a neural network of a machine learning system is trained with the plurality of comparison data sets with a specification that each comparison data set fed to the neural network is associated with a classification of a plurality of classifications; and wherein each test data set is assigned one of the classifications by the neural network.

14. The method according to claim 1, wherein a neural network of a machine learning system is trained with the comparison data sets with a specification that each comparison data set fed to the neural network is different from all other comparison data sets of the plurality of comparison data sets to provide a trained neural network, wherein a mathematical comparison value is generated and stored for each comparison data set after completion of the training, wherein a mathematical test value is generated and stored for each test data set with the trained neural network, and wherein the first wood-based panel is identified as the wood-based panel for which the comparison data set was generated if the mathematical test value matches a comparison value.

15. The method according to claim 13, wherein the method is carried out for a classification of the test image.

16. The method according to claim 13, wherein the method is performed separately for each comparison image in each of the plurality of classifications.

17. The method according to claim 1, wherein the respective comparison data set is determined from the respective comparison image captured for the respective wood-based panel based on a geometry, a topography, and/or a distribution of wood material elements of the respective wood-based material, and wherein the test data set is determined from the test image based on a geometry, a topography, and/or a distribution of wood material elements of the first wood-based material.

* * * * *